US012783832B2

(12) United States Patent
Adrian et al.

(10) Patent No.: US 12,783,832 B2
(45) Date of Patent: Nov. 3, 2026

(54) GLASS MEDIA UNIQUE IDENTIFICATION AND TRACKING SYSTEM

(71) Applicant: Microsoft Technology Licensing, LLC, Redmond, WA (US)

(72) Inventors: Jason David Adrian, Woodinville, WA (US); Richard Black, Cambridge (GB); Austin Nicholas Donnelly, Cambridge (GB); David Lara Saucedo, London (GB); Serguei Anatolievitch Legtchenko, Cambridge (GB); Hugh Williams, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/760,249

(22) Filed: Jul. 1, 2024

(65) Prior Publication Data

US 2024/0354532 A1 Oct. 24, 2024

Related U.S. Application Data

(63) Continuation of application No. 17/873,704, filed on Jul. 26, 2022, now Pat. No. 12,056,568, which is a
(Continued)

(51) Int. Cl.
*G06K 7/14* (2006.01)
*G06K 19/06* (2006.01)

(52) U.S. Cl.
CPC ......... *G06K 7/1417* (2013.01); *G06K 7/1413* (2013.01); *G06K 19/06028* (2013.01); *G06K 19/06037* (2013.01)

(58) Field of Classification Search
CPC .. G06K 7/1404; G06K 7/1408; G06K 7/1413; G06K 7/1417; G06K 7/1439;
(Continued)

(56) References Cited

U.S. PATENT DOCUMENTS

| | | | | |
|---|---|---|---|---|
| 5,489,769 A * | 2/1996 | Kubo | G06K 7/1093 235/462.09 |
| 5,706,047 A * | 1/1998 | Lentz | G11B 19/04 235/462.03 |

(Continued)

FOREIGN PATENT DOCUMENTS

| | | | |
|---|---|---|---|
| JP | 3135876 B2 * | 2/2001 | |
| WO | WO-2007044567 A2 * | 4/2007 | G11B 23/0014 |
| WO | 2019156740 A1 | 8/2019 | |

OTHER PUBLICATIONS

Extended European Search Report Received for European Application No. 24189711.5, mailed on Oct. 29, 2024, 10 pages.

(Continued)

*Primary Examiner* — Thien M Le
*Assistant Examiner* — April A Taylor
(74) *Attorney, Agent, or Firm* — Klarquist Sparkman, LLP

(57) ABSTRACT

A transparent substrate that encodes data therein having optically readable identification indicia corresponding to identifying information regarding the substrate. The optically readable identification indicia may be readable from the transparent substrate by altering the reflectivity of the transparent substrate in indicia portions that may be read by a scanner or reader (e.g., a barcode reader). The optically readable identification indicia may be provided on a common surface with a data zone in which data is encoded in the transparent substrate. Alternatively or additionally, the optically readable identification indicia may be provided on another, different surface than the surface on which the data is encoded in a data zone.

20 Claims, 10 Drawing Sheets

Related U.S. Application Data continuation of application No. 16/666,778, filed on Oct. 29, 2019, now Pat. No. 11,443,129.

(58) Field of Classification Search
CPC ....... G06K 19/06009; G06K 19/06018; G06K 19/06028; G06K 19/06037; G06K 19/06046
See application file for complete search history.

(56) References Cited

U.S. PATENT DOCUMENTS

| | | | | |
|---|---|---|---|---|
| 6,144,742 | A * | 11/2000 | Gotoh | G11B 20/0021 380/201 |
| 7,292,147 | B2 * | 11/2007 | Benedikt | G06K 19/042 340/572.1 |
| 7,774,806 | B2 * | 8/2010 | Pempsell | G11B 23/0014 720/721 |
| 8,181,873 | B2 * | 5/2012 | Ashizaki | G06K 7/10178 340/572.1 |
| 10,236,027 | B1 * | 3/2019 | Georgiou | G11B 11/10532 |
| 11,443,129 | B2 * | 9/2022 | Adrian | G06K 19/06037 |
| 12,056,568 | B2 * | 8/2024 | Adrian | G06K 19/06037 |
| 2001/0013023 | A1 | 8/2001 | Oshima et al. | |

OTHER PUBLICATIONS

Decision to grant a European patent pursuant to Article 97(1) received in European Application No. 20801071.0, mailed on Aug. 1, 2024, 2 pages.
Communication under Rules 70(2) and 70a (2) Received for European Application No. 24189711.5, mailed on Dec. 2, 2024, 2 pages.
Communication pursuant to Article 94(3) EPC Received for European Application No. 24189711.5, mailed on Dec. 17, 2025, 06 pages.

* cited by examiner

GLASS MEDIA UNIQUE IDENTIFICATION AND TRACKING SYSTEM

CROSS-REFERENCE TO RELATED APPLICATIONS

This application is a continuation application of U.S. patent application Ser. No. 17/873,704, filed on Jul. 26, 2022, which is a continuation application of U.S. patent application Ser. No. 16/666,778, filed on Oct. 29, 2019, now U.S. Pat. No. 11,443,129, the entire disclosures of all are hereby incorporated by reference.

BACKGROUND

The amount of digital data that is created and saved continues to grow. With the increased prevalence of cloud computing environments, such data is often saved to cloud storage, which may include storage at server facilities, data centers, or the like. Often cloud computing providers provide data on physical media to users in response to a request for data or for purposes of backing up such data. Regardless of the specific context, the demand for long-term data storage continues to grow. For example, it is expected that soon, zettabytes of data will be stored in cloud storage. The enormous scale of current and anticipated data stores is expected to drive new approaches to large-scale storage systems. However, the management of such large-scale storage systems will continue to be of utmost concern for the efficient operation of such large-scale storage systems.

SUMMARY

The present disclosure relates to the identification of transparent substrates used for the storage of data. Specifically, an optically encoded transparent substrate for storage of data is described including a data zone comprising optically encoded data within the transparent substrate and optically readable identification indicia outside the data zone corresponding to identifying information regarding the transparent optically encoded storage transparent substrate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
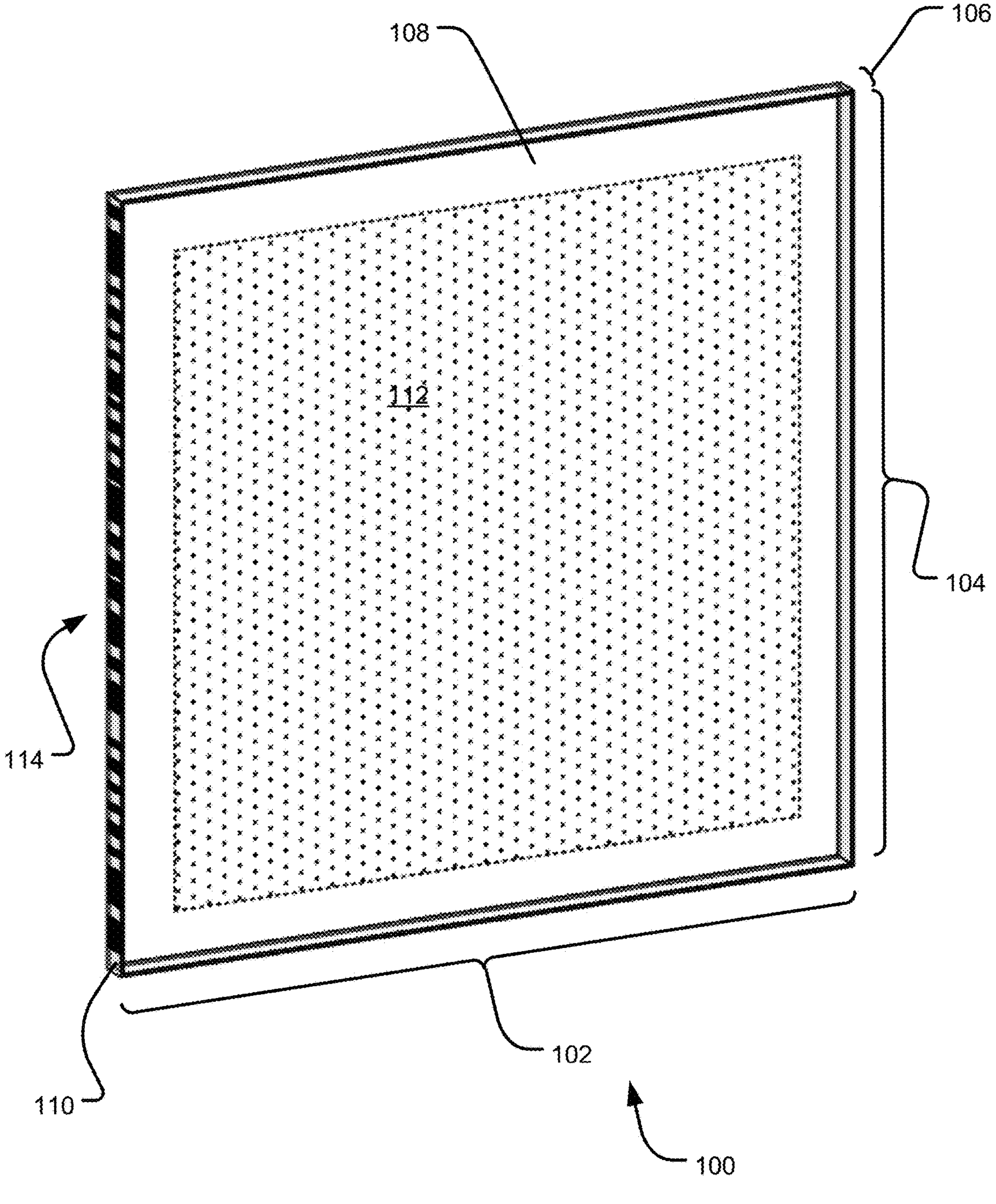
FIG. 1 depicts an example of a transparent substrate having optically readable identification indicia on a side surface of the substrate.

The present disclosure generally relates to the identification of storage media. Specifically, the present disclosure facilitates the use of an optically readable identification indicia provided on a transparent storage substrate for use in identifying the transparent storage substrate. Transparent storage substrates have been proposed for use in large-scale storage systems for persistent storage of data. The transparent storage substrates may be encoded with data using "voxels" or localized areas of focus in which the substrate lattice is manipulated using controlled laser light. In turn, the voxels may be read from the transparent substrate. The voxels are written in a data zone of the transparent substrate that is positioned relative to a surface of the substrate.

These techniques that use a transparent substrate for storage of encoded data may provide robust storage systems that are resistant or impervious to various modes of failure common to persistent storage. For example, neither exposure to extreme heat (e.g., including direct contact with a flame), water, or an electromagnetic pulse (EMP) affect the encoded data in the transparent substrate. Accordingly, unlike other persistent storage media such as magnetic memory (e.g., tape drives, hard disk drives, etc.) or other optical memory (e.g., DVDs and the like), the transparent substrate in which voxels are encoded may facilitate very long term high capacity memory stores that are resistant to degradation from traditional environmental conditions.

While encoded transparent substrates provide a number of advantages, a number of challenges are also presented. For example, such substrates may be devoid of any distinguishable features as the encoded voxels may not be visible or provide any discernable marking to a human viewing the substrate. As such, traditional mechanisms for identifying storage media such as labels, printed markings, etc. are not sufficient to identify transparent substrates as such mechanisms are not similarly resistant or impervious to the kinds of environmental conditions that transparent substrates survive. Furthermore, because light must be passed through the transparent substrate to read encoded data from the voxels, the optical path for reading the voxels cannot be blocked or the optical qualities otherwise disturbed. In this regard, the advent of transparent substrates for use in storage of data has resulted in a technical problem related to how to identify and/or catalog the transparent substrates of a large-scale storage system in view of the fact that traditional identification methods are not suitable for use with transparent media.

Accordingly, the present disclosure presents approaches to optically readable identification indicia provided on the transparent substrate. The technical effect of the optically readable identification indicia is to allow for efficient identification of a substrate through the lifetime of the transparent substrate. The optically readable identification indicia may be readable using conventional scanning or image processing approaches. In turn, the data encoded in the transparent substrate, which requires computationally complex and costly readers, need not be employed to identify the transparent substrate. Accordingly, data may be maintained in persistent memory using transparent substrates such that the transparent substrates may be efficiently managed throughout the lifetime of the transparent substrate regardless of the conditions to which the substrate is exposed.

FIG. 1 depicts an example of a transparent substrate 100 according to the present disclosure. The substrate 100 has a width 102, length 104, and thickness 106. The width 102 and length 104 may be much greater than (e.g., more than twice, more than five times, or even more than ten times) the thickness 106. A second surface 110 may be defined in relation to the thickness 106 of the substrate 100. That is, the second surface 110 extends from the first surface 108. The second surface 110 is a side surface of the substrate 100 relative to the main first surface 108, which is a data-bearing surface. While a transparent substrate 100 is discussed herein, the present disclosure may have applicability in non-transparent substrates that are used to store optically encoded data.

While the substrate 100 is shown in FIG. 1 as a parallelepiped, other forms of substrate 100 may be provided, including, for example, a disc. In addition, while the second surface 110 is depicted in FIG. 1 as being perpendicular to the first surface 108, other arrangements in which the second surface 110 extends obliquely from the first surface 108 (e.g., at an angle such that the intersection between the first surface 108 and the second surface 110 is not perpendicular) may be provided without limitation. Moreover, the first surface 108 and the second surface 110 need not be planar and could include curved or otherwise contoured surfaces.

The transparent substrate 100 may include encoded data that is stored in the transparent substrate 100. Accordingly, the first surface 108 includes a data zone 112. The data zone 112 may include optically encoded data that is encoded within the substrate 100. As an example, optical data-storage systems have been proposed in which a transparent substrate is encoded with voxels comprising multi-bit data values. These voxels may be created by modifying a glass structure using controlled lasers. One such example of this approach is described in U.S. Pat. No. 10,236,027 entitled "DATA STORAGE USING LIGHT OF SPATIALLY MODULATED PHASE AND POLARIZATION" filed on Feb. 12, 2018, the entirety of which is incorporated by reference herein. In this regard, the data zone 112 may provide a high capacity data store (e.g., with a data storage capacity of greater than 500 GB, greater than 1 TB, or potentially even greater). Thus, the first surface 108 that includes the data zone 112 may be referred to as a data-bearing surface. In this regard, other surfaces (e.g., the second surface 110) may be referred to as non-data-bearing surfaces meaning that the surfaces do not facilitate the high capacity data store provided by the data zone 112.

The data zone 112 may be generally provided in relation to the first surface 108. Thus, the first surface 108 is a data-bearing surface (e.g., such that write and/or read operations in the data zone 112 are facilitated from the first surface 108). The data zone 112 may extend to a portion of, but not all of the first surface 108. Accordingly, the first surface 108 may include a first area associated with the data zone 112 and a second area that excludes the data zone 112 (e.g., does not have optically encoded data stored therein). The data zone 112 may comprise multiple layers of voxels that extend some depth from the first surface 108. The depth of the voxels in the data zone 112 may extend only over a partial extent of the thickness 106 of the substrate 100. That is, the depth of the voxels in the data zone 112 may be less than the thickness 106 of the substrate 100. Accordingly, the data zone 112 may be defined relative to a portion of the width 102, length 104, and thickness 106 of the substrate 100.

The substrate 100 also includes optically readable identification indicia 114 corresponding to identifying information regarding the substrate 100. As shown in FIG. 1, the optically readable identification indicia 114 may be disposed on a surface of the substrate 100 other than the first surface 108 associated with the data zone 112. For example, the optically readable identification indicia 114 may be provided on the second surface 110 of the substrate 100. That is, the optically readable identification indicia 114 may be on a non-data bearing surface or a side surface as described above. The optically readable identification indicia 114 may comprise a one-dimensional bar code extending along the length 104 of the second surface 110. The optically readable identification indicia 114 may comprise indicia portions having different reflective properties than areas of the second surface 110 of the substrate 100 outside the indicia portions. This may allow a scanner or other reader to distinguish the indicia portions on the transparent substrate 100. The indicia portions may have different reflective properties such that the indicia portions may be sensed by a reader when scanned by the reader that directs light toward the second surface 110 on which the indicia portions are provided and measures the reflected light therefrom (e.g., such as a barcode scanner or the like). In one example, a visual imaging processor may be used to identify the optically readable identification indicia 114. In this regard, a camera or other scanner may capture image data regarding the optically readable identification indicia 114, which may be provided to the visual imaging processor that employs machine learning to identify and/or decode the optically readable identification indicia 114. For instance, the visual imaging processor may utilize or extract certain information from the image data, including particular wavelengths of light, a particular incidence of light, or other characteristics to assist in discerning the optically readable identification indicia 114. In this regard, the optically readable identification indicia 114 need not be human visible or perceptible in the transparent substrate 100 but may be discernable by an appropriate reader.

As can be appreciated, the reader used to read the optically readable identification indicia 114 may use a different encoding/decoding technique than the data zone 112. That is, the data zone 112 may include data encoded into voxels that may be read and decoded using appropriate technology. In contrast, the optically readable identification indicia 114 may utilize one-dimensional barcode encoding to allow for a barcode reader to scan and decode the optically readable identification indicia 114. Given the complexity of readers capable of decoding voxels, such readers capable of decoding the encoded data from the data zone 112 may be expensive and relatively rare. Thus, data center customers or other owners/possessors of the transparent substrate 100 may not have the capability to read data from the data zone 112. However, such users may have easier access to a reader capable of reading the optically readable identification indicia 114. Specifically, the reader used to read the optically readable identification indicia 114 may be less physically and/or computationally complicated than the technology used to read the encoded data from the data zone 112.

For example, the indicia portions may comprise etched portions of the surface of the substrate. However, other appropriate approaches to the creation of the indicia portions may be provided without limitation, including the application of an epoxy, staining, chemical or metallic deposition, lithography, or other approaches. For example, as described in greater detail below, laser manipulation of the glass may be used to create the indicia portions.

The optically readable identification indicia 114 may include information that identifies the substrate 100. In the absence of the optically readable identification indicia 114, the substrate 100 may otherwise be indistinguishable to human users from other substrates as the data zone 112 does not include human-perceivable data or other markings that would allow a substrate 100 to be identified. Thus, rather than having to decode data from the data zone 112 to determine the contents and/or identity of the substrate 100, the optically readable identification indicia 114 may provide a more efficient mechanism to identify the substrate 100. The identity of the substrate may be indexed or otherwise associated with information regarding the data encoded in the data zone 112. As such, scanning the optically readable identification indicia 114 may allow for the substrate 100 to be identified, and the data encoded in the data zone 112 to be readily identified without requiring the data to be decoded from the data zone 112. Accordingly, in an example, the optically readable identification indicia 114 may include an identifier such as a serial number or other unique identifiers for the substrate 100. In this regard, the data encoded in the data zone 112 may be tracked by the optically readable identification indicia 114 of the substrate 100.

Other information may also be included in (e.g., encoded by) or associated with the optically readable identification indicia 114, including metadata regarding the substrate 100. The metadata may include any appropriate information regarding the substrate 100 such as ownership information, date/time information for when the substrate was written, a source of the optically encoded data in the data zone 112, library information regarding the data in the data zone 112, or any other appropriate information regarding the substrate 100 or the data encoded in the data zone 112. The metadata may be encoded in the optically readable identification indicia 114 or may be associated with a unique identifier for the substrate 100 that may be determined by reading the optically readable identification indicia 114.

In one example, optically readable identification indicia 114 may be provided on a plurality of sides of the transparent substrate 100. For example, the optically readable identification indicia 114 may be provided on a number of non-data bearing sides, not including a data zone 112. Different portions of the information may be provided in respective optically readable identification indicia 114 provided on respective sides. As an example, a serial number may be provided in optically readable identification indicia 114 on a first side, and one or more pieces of metadata regarding the substrate 100 may be provided in optically readable identification indicia 114 on at least one other side of the substrate 100.

The optically readable identification indicia 114 may be created on the substrate 100 prior to, concurrently with, or subsequent to the data in the data zone 112 being encoded in the substrate 100. For example, the optically readable identification indicia 114 may be created on a blank transparent substrate 100 (e.g., by a manufacturer of the substrate) prior to encoding the optically encoded data in the data zone 112. Alternatively, the optically readable identification indicia 114 may be created on the transparent substrate 100 after data has been encoded into the data zone 112. In other approaches described below, the optically readable identification indicia may be created concurrently with the encoding of data in the data zone 112.

Figure 2:
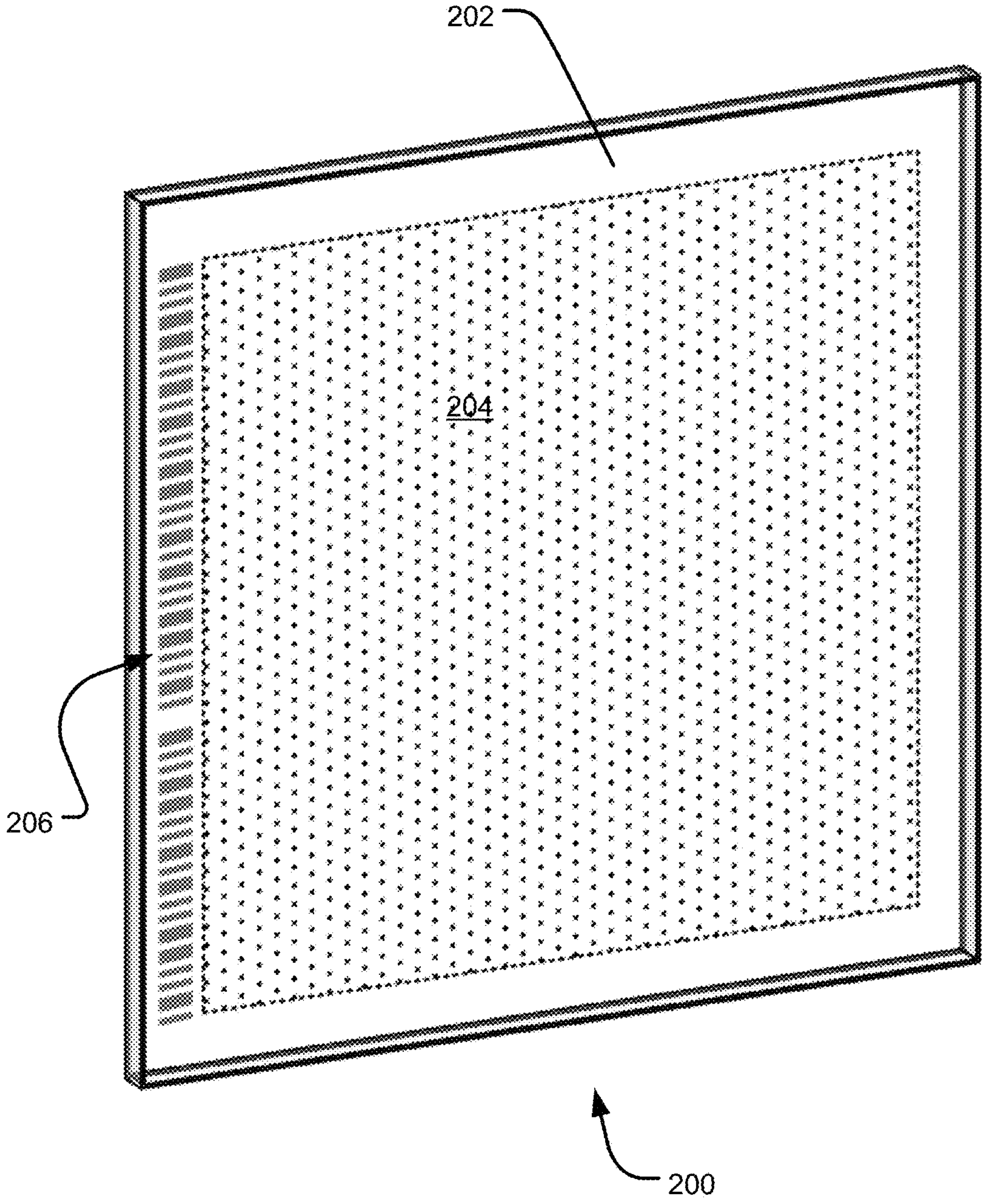
FIG. 2 depicts an example of a transparent substrate having optically readable identification indicia on a surface of the substrate that also includes a data zone for encoding data in the substrate.

FIG. 2 depicts another example of a transparent substrate 200 according to the present disclosure. The transparent substrate 200 includes a surface 202 that includes a data zone 204 comprising optically encoded data (e.g., voxels as described above). Optically readable identification indicia 206 may also be provided on the surface 202. Accordingly, the optically readable identification indicia 206 may be provided on the surface 202 on which the data zone 304 is defined. The optically readable identification indicia 206 is provided in an area of the surface 202 outside the data zone 204. That is, the optically readable identification indicia 206 may be provided in a non-overlapping relationship to the data zone 204 relative to the surface 202. In the example depicted in FIG. 2, the optically readable identification indicia 206 comprises a one-dimensional bar code.

Figure 3:
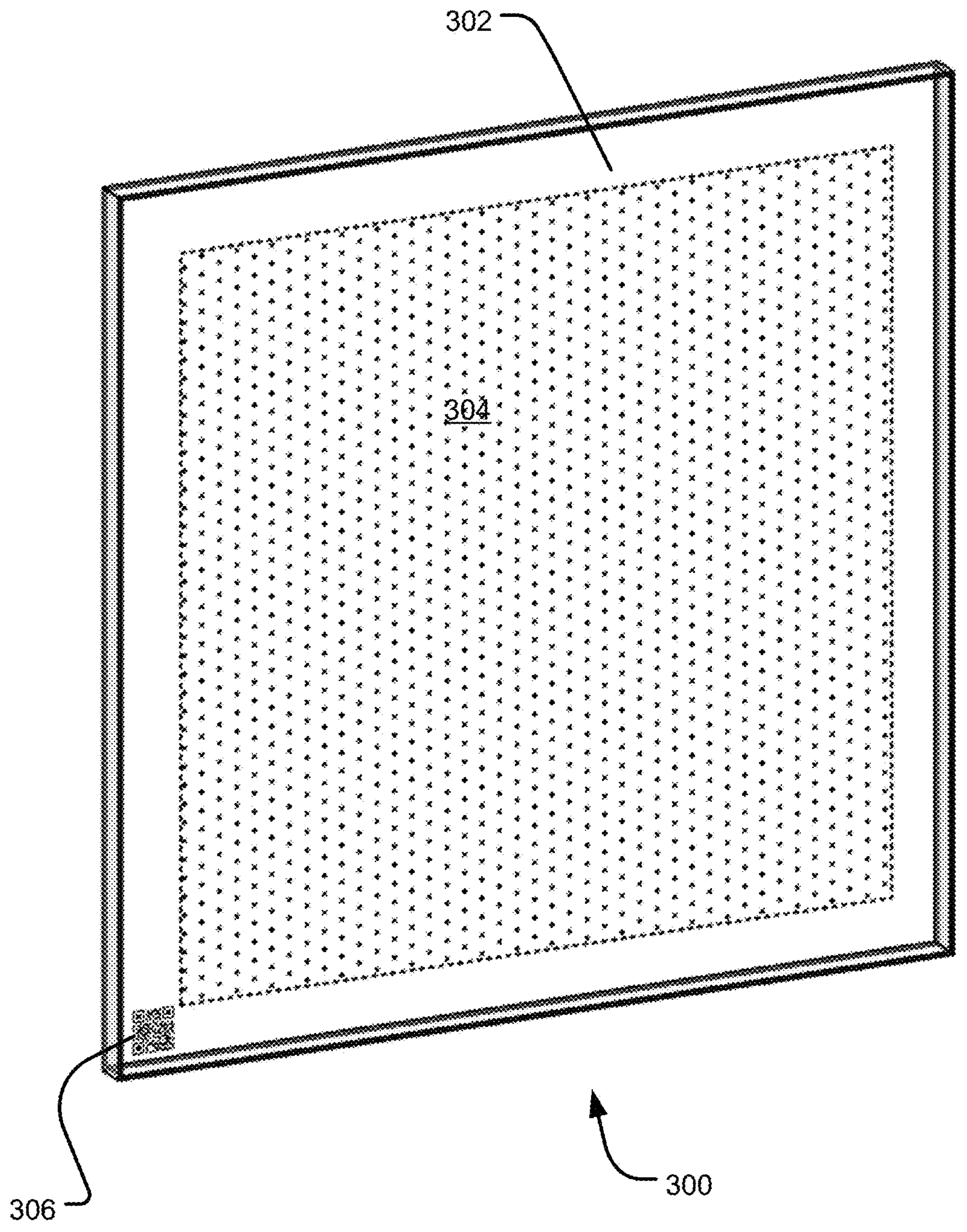
FIG. 3 depicts another example of a transparent substrate having optically readable identification indicia on a surface of the substrate that also includes a data zone for encoding data in the substrate.

FIG. 3 depicts another example of a transparent substrate 300 according to the present disclosure. The transparent substrate 300 includes a surface 302 that includes a data zone 304 comprising optically encoded data (e.g., voxels as described above). Optically readable identification indicia 306 may also be provided on the surface 302. Accordingly, the optically readable identification indicia 306 may be provided on the surface 302 on which the data zone 304 is defined. The optically readable identification indicia 306 is provided in an area of the surface 302 outside the data zone 304. That is, the optically readable identification indicia 306 may be provided in a non-overlapping relationship to the data zone 304 relative to the surface 302. In the example depicted in FIG. 3, the optically readable identification indicia 306 comprises a two-dimensional bar code.

In either of the examples depicted in FIG. 2 or 3, the optically readable identification indicia 206/306 may be created using the same process as that used to encode the encoded data in the data zone 204/304. For example, a common optical writing system may be used to both encode the data in the data zone 204/304 and create the optically readable identification indicia 206/306. For example, the encoded data in the data zone 204/304 may comprise voxels comprising multi-bit encoded data values. Voxels may also be used to create the optically readable identification indicia 206/306. In this regard, the optically readable identification indicia 206/306 may be generated concurrently with the encoding of the data in the data zone 204/304.

While the optically readable identification indicia 206/306 may be created using the technological approach used to encode the data in the data zone 204/304, the technique for reading the optically readable identification indicia 206/306 may be different than the technique used to read the encoded data in the data zone 204/304. For example, the creation of the voxels comprising the optically readable identification indicia 206/306 may modify the reflectance of the surface 202/302 of the substrate 200/300. In this regard, the voxels that create the optically readable identification indicia 206/306 may not actually contain encoded data within the voxels (e.g., "dummy" or empty voxels may be used). However, the creation of the voxels to define the optically readable identification indicia 204/304 may have a bulk effect to change the reflectance of the transparent substrate 200/300 in the area in which the dummy or empty voxels are created sufficiently such that a scanner or other optical reader may be operative to sense the optically readable identification indicia 206/306. For example, light of a particular wavelength, light at a particular angle of incidence to the substrate 100, or other particular characteristics of light may be provided on the optically readable identification indicia 206/306 such that the optically readable identification indicia 206/306 may be read by the scanner. That is, the bulk effect of the creation of the voxels to define the optically readable identification indicia 206/306 may allow for decoding of the optically readable identification indicia 206/306 using a barcode scanning technology that does not include reading data from the voxels that create the optically readable identification indicia 206/306. As such, the optically readable identification indicia 206/306 may be read or decoded using a technique other than the technique to read/decode the encoded data in the data zone 204/304.

In yet another example, an example as shown in FIG. 1 may be realized in which an optically readable identification indicia 114 is created relative to a non-data bearing surface by the creation of voxels relative to a data-bearing surface. For example, as voxels may be created in a depth of the substrate 100 corresponding to the thickness 106, voxels created very near an edge of a data-bearing surface at a sufficient depth may be read by a reader relative to the non-data bearing surface. That is, while the voxels are created at a depth to the first surface 108, the voxels may be near enough a second surface 110 of the transparent substrate such that the depth of the voxels on the first surface 108 are detectable from the second surface 110. Thus, the optically readable identification indicia 114 readable from the second surface 110 may include indicia portions that are created by voxels created near the edge of the first surface 108 adjacent to the second surface 110.

Figure 4:
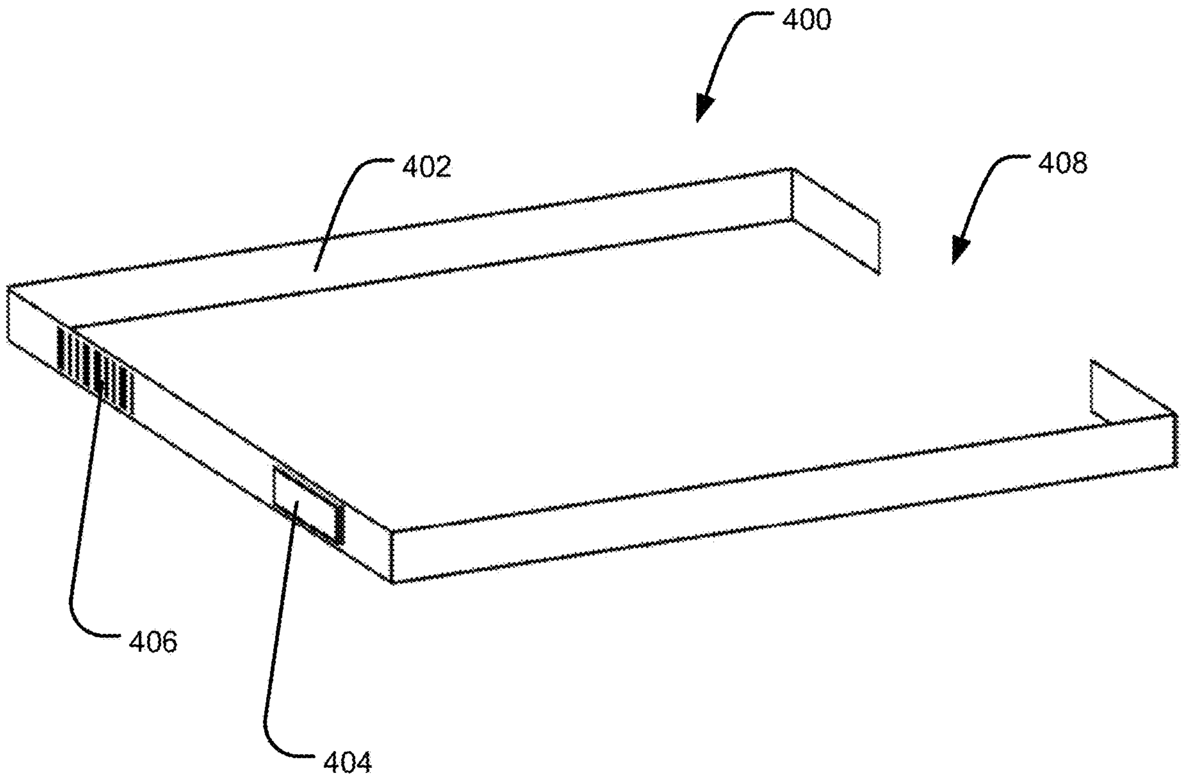
FIG. 4 depicts an example of a carrier for use in conjunction with a transparent substrate.

With reference to FIG. 4, an example of a carrier 400 is shown that may be used in conjunction with a transparent substrate described herein comprising optically encoded data therein. The carrier 400 includes a frame 402. The frame 402 may be dimensioned to extend about at least a portion of (e.g., at least a partial perimeter of) a transparent substrate. The frame 402 may act to provide some amount of protection to a transparent substrate surrounded by the frame 402. For instance, the frame 402 may allow for manipulation of a transparent substrate (e.g., by a human or non-human) to preclude contact directly with the transparent substrate to preserve optical qualities thereof (e.g., to avoid smudging or otherwise obscuring the optical qualities of the substrate). Additionally or alternatively, the frame 402 may provide some amount of shock, vibration, or other mechanical protection to protect a transparent substrate and reduce the likelihood of scratching, chipping, cracking, or other damage to the substrate. For example, the frame 402 may include an elastomeric material that contacts at least a portion of the transparent substrate when disposed relative to the substrate. The elastomeric material may provide protection by absorbing or otherwise mitigating some amount of force applied to a substrate.

The carrier 400 may also include identifying indicia thereon. For example, the carrier 400 may include an identification chip 404, such as an RFID chip or the like. The identification chip 404 may be programmed with identifying information related to a substrate about which the carrier 400 is disposed. The identifying information may be the same as that of an optically readable identification indicia of the substrate as described above or may be a unique carrier identifier that may be associated with a substrate identifier encoded in optically readable identification indicia on the substrate as described above. The identification chip 404 may also be programmed to include or be associated with metadata regarding the carrier, substrate, and/or optically encoded data contained in a data zone of the substrate. Additionally or alternatively, the carrier 400 may include a printed marking 406. The printed marking 406 may encode a carrier identifier or an identifier of the substrate. The printed marking 406 may also include or be associated with metadata regarding the carrier, substrate, or encoded data of a carrier in a data zone. The printed marking 406 may be printed directly on the frame 402 or may be displayed on an appropriate display integrated into the frame 402 (e.g., an e-ink display or the like).

As described above, the carrier 400 may extend about at least a portion of a perimeter of a transparent substrate. The frame 402 may include a gap 408 between frame portions. The gap 408 may provide a span to allow an optically readable identification indicia disposed on a substrate to be visible while the substrate is engaged with the carrier 400.

Figure 5:
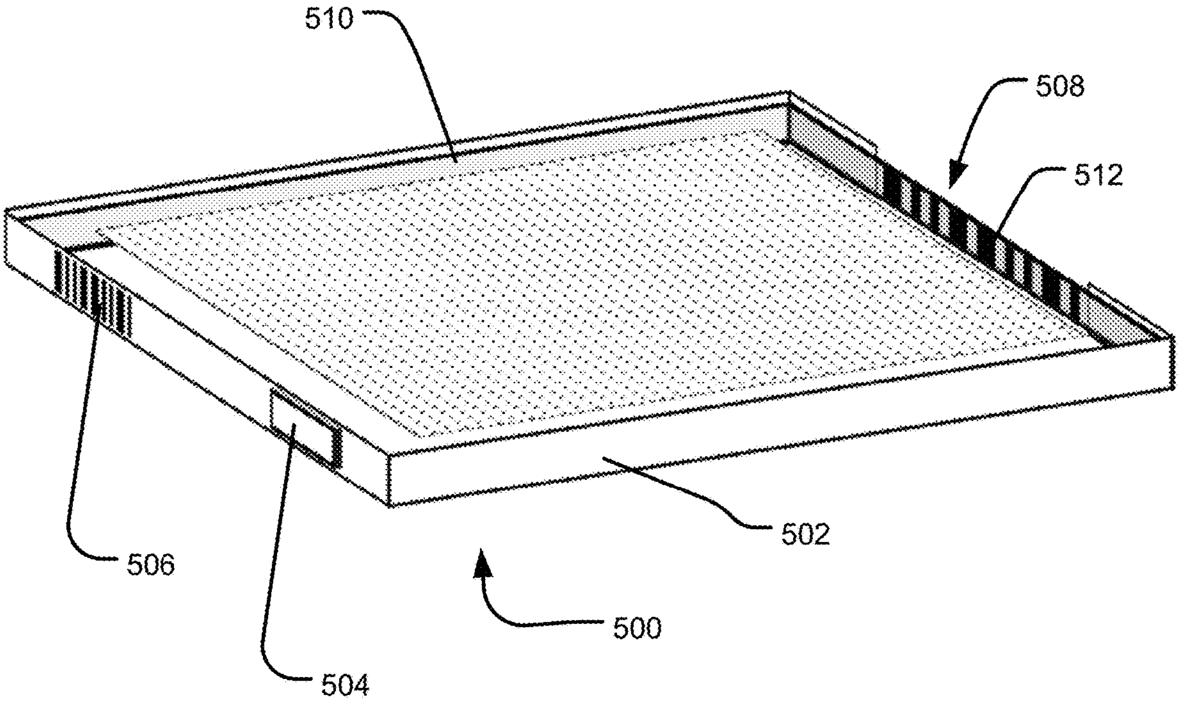
FIG. 5 depicts an example of a transparent substrate disposed in a carrier of FIG. 4.

For example, with further reference to FIG. 5, a carrier 500 is shown with a transparent substrate 510 disposed therein. As can be appreciated, a frame 502 including an identification chip 504 and a printed marking 506 may be provided as described above. A gap 508 is provided in the frame 502. Specifically, the gap 508 may extend relative to a surface of the substrate 510 on which optically readable identification indicia 512 is disposed. As such, the optically readable identification indicia 512 may be exposed when the substrate 510 is engaged with the carrier 500 such that the optically readable identification indicia 512 is exposed for scanning.

Figure 6:
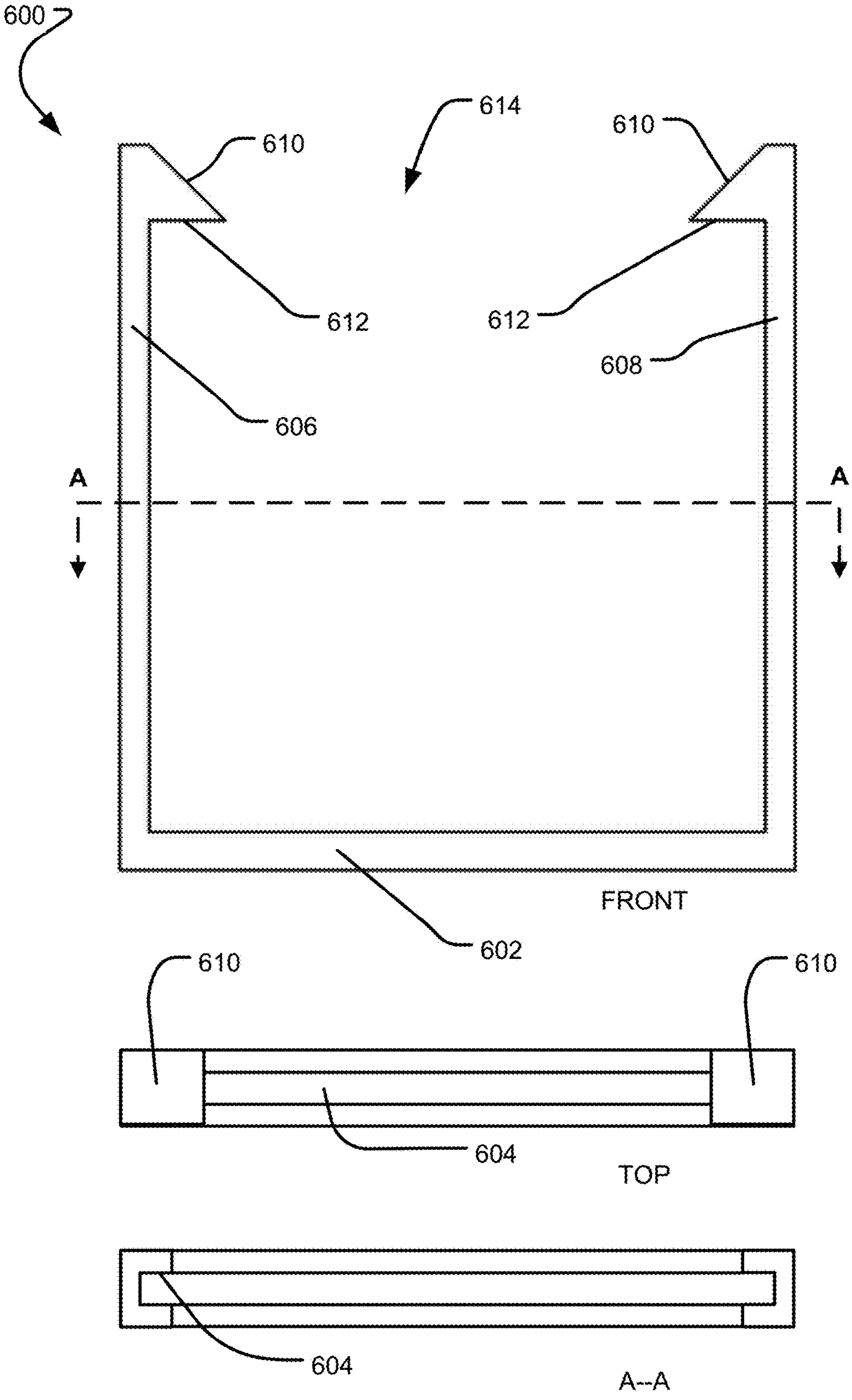
FIG. 6 depicts a front, top, and cross-sectional view of another example of a carrier for use in conjunction with a transparent substrate.

FIG. 6 illustrates another example of a carrier 600 for engagement with a transparent substrate for protection thereof. FIG. 6 includes, from top to bottom of the sheet, a front, top, and cross-sectional view taken along section line A--A of the carrier 600. The carrier 600 includes a frame 602 that is configured to extend about at least a portion of a substrate. The frame 602 may include a groove 604 that is sized to receive a thickness of the substrate. The groove 604 may be lined with an elastomeric or other relatively soft material to assist in the protection of a substrate from mechanical damage, as described above. The groove 604 may extend along at least three sides of a substrate when engaged with the carrier 600

The frame 602 may include a first deflectable side portion 606 and a second deflectable side portion 608 that extend parallel to one another. Each of the first deflectable side portion 606 and the second deflectable side portion 608 may include a free end portion that includes a ramp portion 610 at the respective ends of the first deflectable side portion 606 and the second deflectable side portion 608. A span 614 between the respective ramp portions 610 may be less than a width of a substrate to be inserted into the carrier 600. As such, the ramp portion 610 may contact a substrate as the substrate is inserted into the carrier 600. In turn, the ramp portions may engage with the substrate to deflect the first deflectable side portion 606 and the second deflectable side portion 608 to a degree to allow the substrate to engage the groove 604. Once the substrate has been inserted into the groove 604, the substrate may be advanced into the carrier 600 such that tabs 612 of the ramp portions 610 may clear the substrate and allow the deflectable side portions 606 and 608 to return to a parallel position. In turn, the tabs 612 may extend relative to a side of the substrate to prevent the substrate from being retracted from the carrier 600 without deflection of the first deflectable side portion 606 and the second deflectable side portion 608. Thereafter, the span 614 may allow an optically readable identification indicia of the substrate disposed on a surface engaged by the tabs 612 to be read when the substrate is inserted into the carrier.

Figure 7:
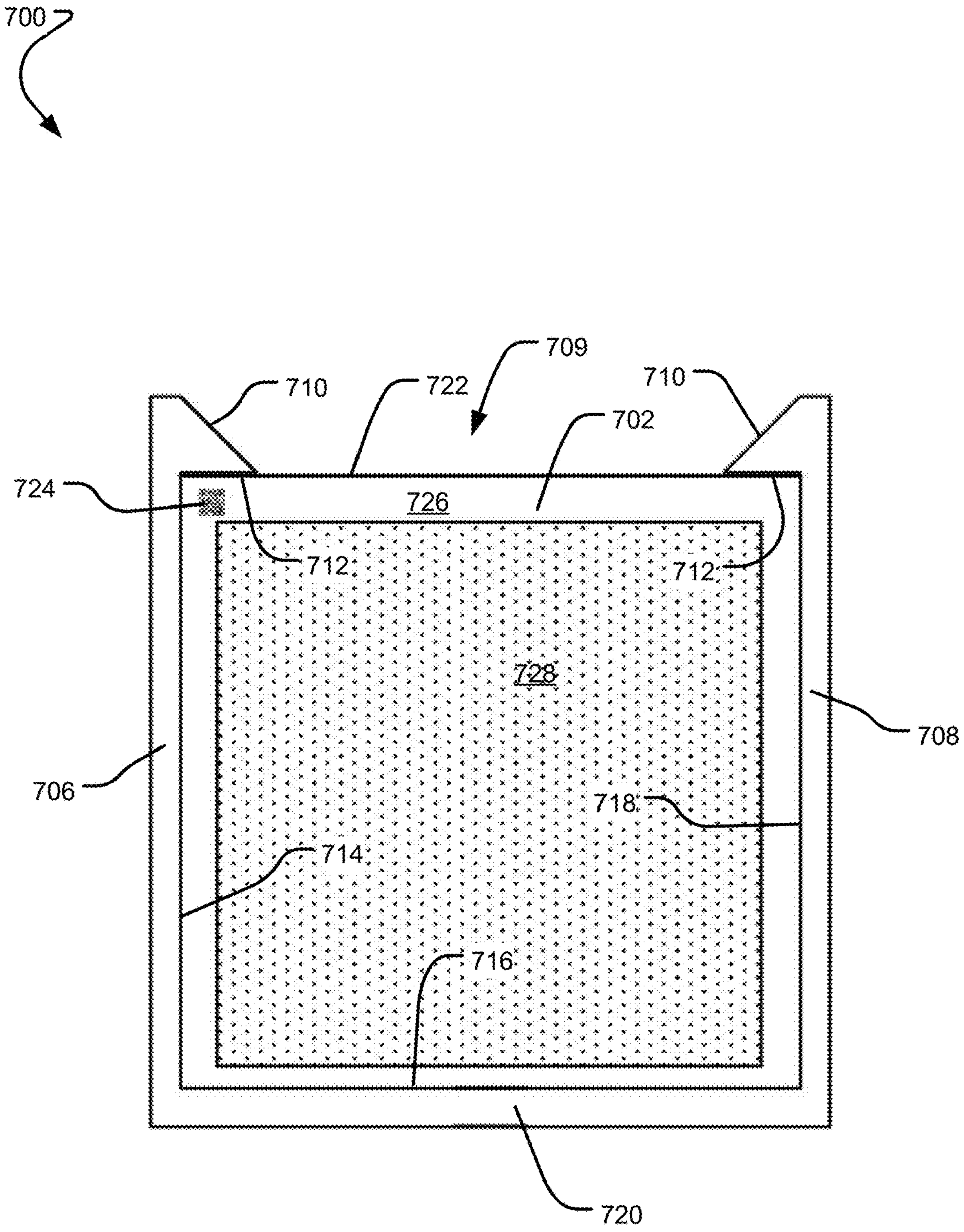
FIG. 7 depicts an example of a transparent substrate disposed in a carrier of FIG. 6.

For example, FIG. 7 depicts an example of a carrier 700 in which a substrate 702 is inserted. As such, a first side 714, a second side 716, and a third side 718 of the substrate 702 may be engaged with a groove (not shown in FIG. 7) of the frame 720. A fourth side 722 of the substrate 702 may be at least partially exposed in the span 709 between the ramps 710 of a first deflectable side portion 706 and a second deflectable side portion 708.

As can further be appreciated in FIG. 7, an optically readable identification indicia 724 that is on a surface 726 shared with a data zone 728. The optically readable identification indicia 724 may comprise a one-dimensional barcode or a two-dimensional barcode (as shown in FIG. 7). The optically readable identification indicia 724 is located outside the data zone 728 on the surface 726. That is, the optically readable identification indicia 724 is in a non-overlapping relationship with the data zone 728 on the surface 726. The optically readable identification indicia 724 is also located on the surface 726 such that it remains exposed when the substrate 702 is engaged with carrier 700.

Figure 8:
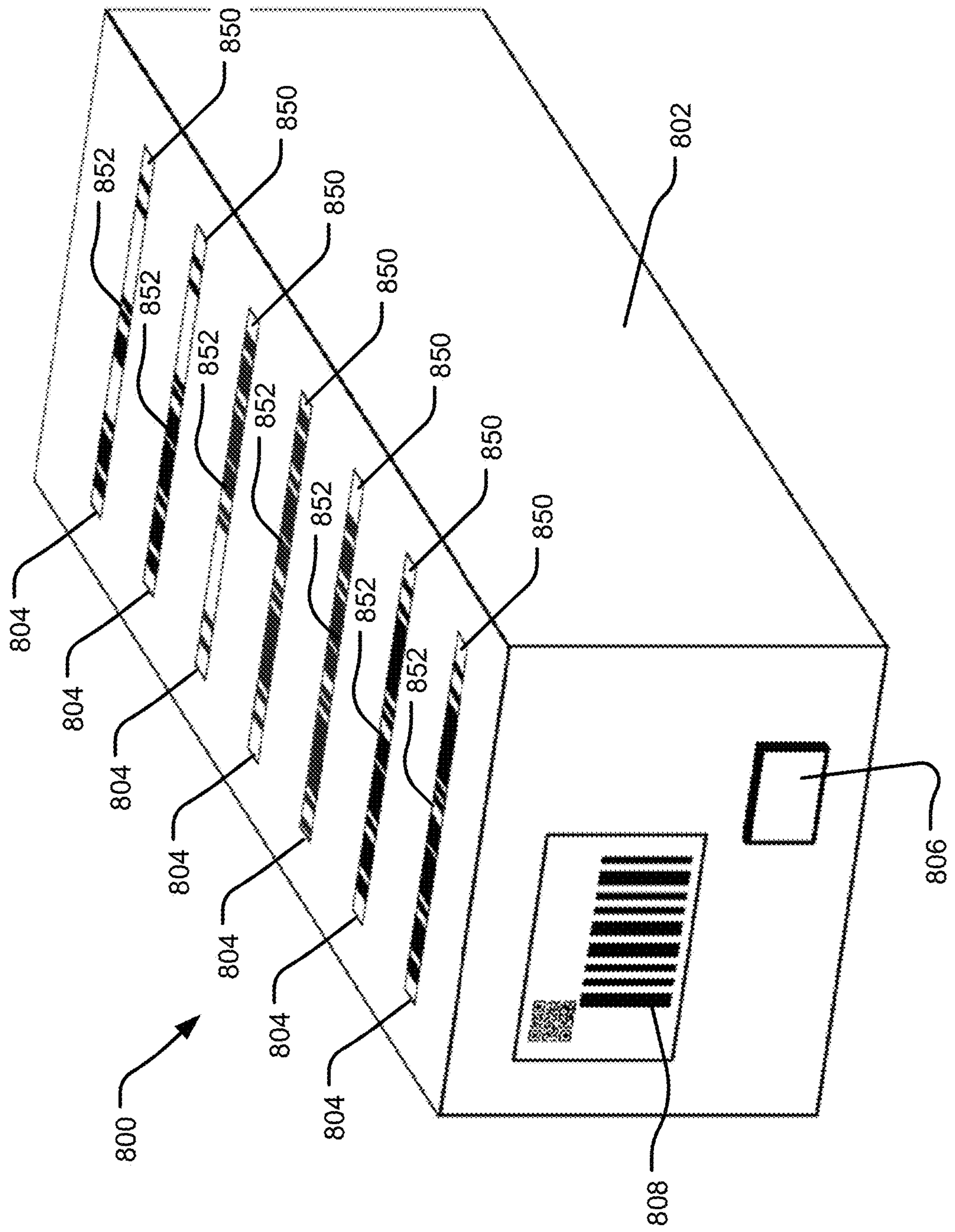
FIG. 8 depicts an example of a carrier capable of holding a plurality of transparent substrates.

FIG. 8 depicts an example of a carrier 800 that may be used to store and/or transport a plurality of transparent substrates. The carrier 800 includes a carrier body 802. A plurality of slots 804 are disposed in the carrier body 802. Each slot 804 may be sized to receive a transparent substrate 850 therein. The slots 804 may be sized such that a side surface of each transparent substrate 850 is visible when the transparent substrate 850 is inserted into a slot 804. In turn, an optically readable identification indicia 852 disposed on the transparent substrate 850 may remain visible when the transparent substrate 850 is disposed in the slot 804.

The carrier body 802 may comprise a polymeric material or other relatively soft material that may provide protection to the substrates 850 disposed therein. Additionally, the carrier body 802 may be transparent to certain RF energy such as X-ray or the like to allow a scanner to discern whether substrates 850 are disposed in the carrier 800.

The carrier 800 may also include an identification chip 806. For example, the identification chip 806 may be an RFID chip that may include information regarding the substrates 850 contained by the carrier 800. For instance, individual identification information for each substrate 850 in the carrier 800 may be recorded in the identification chip 806. Additionally or alternatively, metadata regarding the substrates 850 or encoded data stored thereon may be included in the identification chip 806. Also, a printed marking 808 may be included. The printed marking 808 may include one or more of a one-dimensional barcode, a two-dimensional barcode, human-readable text/graphics, or the like. The printed marking 808 may include information regarding the substrates 850 or the data encoded thereon. The printed marking 808 may be printed on the carrier 800 (e.g., directly on the carrier 800 or on a sticker or the like). Alternatively, the printed marking may include a display such as an e-ink display or the like.

While not shown, the carrier 800 may include a transparent cover that extends relative to the opening of the slots 804 to provide further protection to transparent substrates 850 and/or to assist in retaining the substrates 850 in the carrier. Furthermore, while not explicitly shown, the carrier 800 may receive substrates 850 that are further disposed in a carrier such as that described in FIGS. 4-7. Furthermore, additional or fewer slots 804 and/or substrates 850 than what is shown in FIG. 8 may be provided without limitation.

Figure 9:
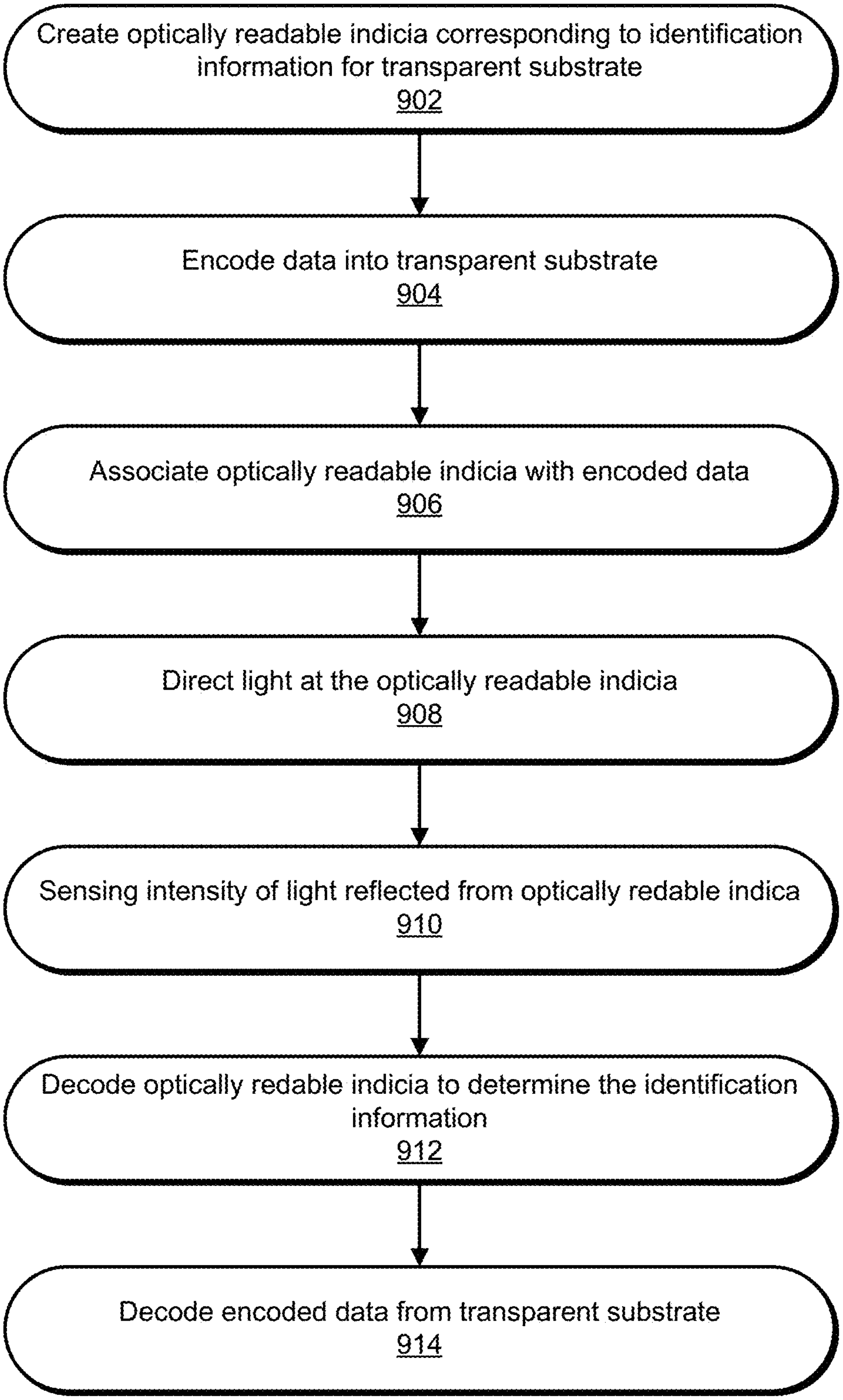
FIG. 9 depicts example operations according to an aspect of the present disclosure.

FIG. 9 depicts example operations 900 according to the present disclosure. The operations 900 include a creating operation 902 in which optically readable identification indicia corresponding to identification information is created on a transparent substrate. An encoding operation 904 encodes data into the transparent substrate in a data zone thereof. While the operations 900 illustrate the creating operation 902 prior to the encoding operation 904, as described above, these operations may occur in any order.

In any regard, the operations 900 also include an associating operation 906 that associates the optically readable identification indicia with the encoded data encoded in the encoding operation 904. For example, the associating operation 906 may include indexing what data is encoded to the identifier for the transparent substrate. In turn, upon identification of the substrate using the optically readable indicia, the identity of the data encoded thereon may be determined.

The operations 900 may also include steps related to identifying a transparent substrate. For example, the operations 900 include a directing operation 908 in which light is directed toward the transparent substrate. In turn, a sensing operation 910 senses the intensity of the reflected light from the optically readable indicia. As discussed above, the optically readable identification indicia may modify the reflectivity of the transparent substrate sufficiently such that the optically readable identification indicia may be discerned upon the directing operation 910. A decoding operation 912 decodes the scanned optically readable identification indicia to determine the identification information encoded by the optically readable indicia. In turn, the identification information may be obtained such that the encoded data on the transparent substrate may be identified. In this regard, a decoding operation 914 may also include decoding the encoded data from the transparent substrate. The decoding operation 914 may include reading the encoded data from a data zone of the transparent substrate using a decoding technique different than the decoding technique used in the decoding operation 912.

Figure 10:
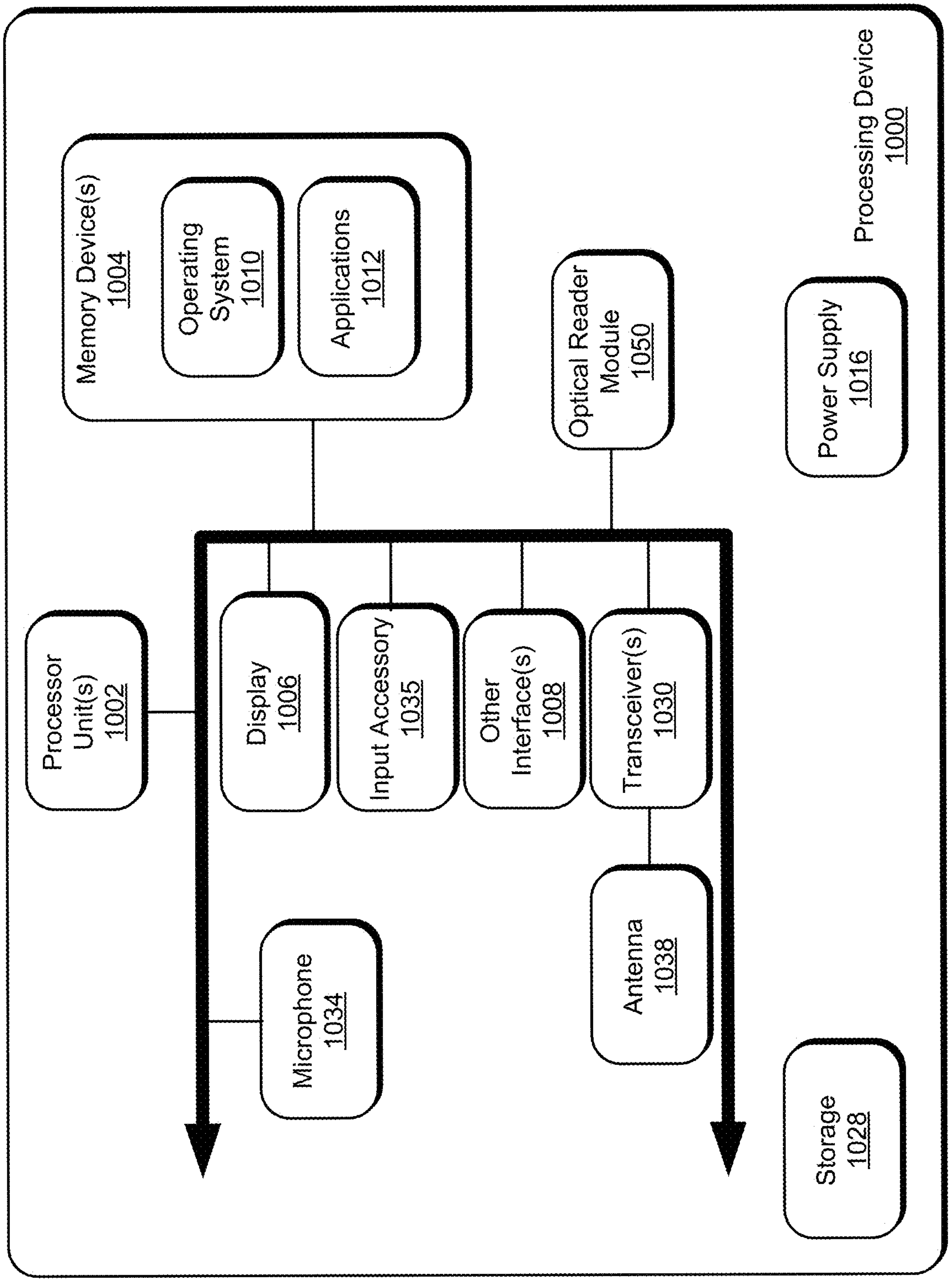
FIG. 10 depicts an example of a processing device that is capable of executing certain aspects of the present disclosure.

FIG. 10 illustrates an example schematic of a processing system 1000 suitable for implementing aspects of the disclosed technology, including an optical reader module 1050 for use in reading and/or decoding optically readable identification indicia as described above. The processing system 1000 includes one or more processor unit(s) 1002, memory 1004, a display 1006, and other interfaces 1008 (e.g., buttons). The memory 1004 generally includes both volatile memory (e.g., RAM) and non-volatile memory (e.g., flash memory). An operating system 1010, such as the Microsoft Windows® operating system resides in the memory 1004 and is executed by the processor unit(s) 1002, although it should be understood that other operating systems may be employed.

One or more applications 1012 are loaded in the memory 1004 and executed on the operating system 1010 by the processor unit(s) 1002. Applications 1012 may receive input from various input local devices such as a microphone 1034, input accessory 1035 (e.g., keypad, mouse, stylus, touchpad, joystick, an instrument mounted input, or the like). Additionally, the applications 1012 may receive input from one or more remote devices such as remotely-located smart devices by communicating with such devices over a wired or wireless network using more communication transceivers 1030 and an antenna 1038 to provide network connectivity (e.g., a mobile phone network, Wi-Fi®, Bluetooth®). The processing device 1000 may also include various other components, such as a positioning system (e.g., a global positioning satellite transceiver), one or more accelerometers, one or more cameras, an audio interface (e.g., the microphone 1034, an audio amplifier and speaker and/or audio jack), and storage devices 1028. Other configurations may also be employed.

The processing system 1000 further includes a power supply 1016, which is powered by one or more batteries or other power sources and which provides power to other components of the processing system 1000. The power supply 1016 may also be connected to an external power source (not shown) that overrides or recharges the built-in batteries or other power sources.

In an example implementation, the optical reader module 1050 may include hardware and/or software embodied by instructions stored in the memory 1004 and/or the storage devices 1028 and processed by the processor unit(s) 1002. The memory 1004 may be the memory of a host device or of an accessory that couples to the host.

The processing system 1000 may include a variety of tangible processor-readable storage media and intangible processor-readable communication signals. Tangible processor-readable storage can be embodied by any available media that can be accessed by the processing system 1000 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 1000. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled, and/or interpreted programming language.

One general aspect of the present disclosure includes an optically encoded transparent substrate for the storage of data that includes a data zone and optically readable identification indicia. The data zone includes optically encoded data within the transparent substrate (e.g., as voxels encoding data bits). The optically readable identification indicia is provided outside the data zone. The optically readable identification indicia corresponds to identifying information regarding the transparent optically encoded storage transparent substrate.

Implementations may include one or more of the following features. The data zone of the transparent substrate may include at least a portion of a first surface of the transparent substrate. Moreover, the transparent substrate may include a second surface extending from the first surface. The optically readable identification indicia may be disposed on the second surface.

In an example, the optically readable identification indicia includes a one-dimensional barcode. The optically readable identification indicia may include respective etched portions of the second surface of the glass.

In an example, the data zone includes a first portion of a first surface of the transparent substrate, and the optically readable identification indicia may be disposed on the first surface in non-overlapping relation with the data zone. The optically encoded data and the optically readable identification indicia may be created by the same optical writing system. The optically encoded data may be readable using a first decoding technique, and the optically readable identification indicia may be readable using a second decoding technique different than the first decoding technique. For example, the first decoding technique may include use of laser light to detect polarization and phase of light passing through a voxel to decode the bit information encoded therein. The second decoding technique may include barcode decoding. In this regard, the optically encoded data may include voxels disposed in the transparent substrate.

In an example, the transparent substrate includes a carrier disposed about at least a portion of the transparent substrate. The carrier may include another optically readable identification indicia disposed on the carrier that corresponds to the optically readable identification indicia of the transparent substrate. The optically readable identification indicia may be readable when the carrier is disposed about the portion of the transparent substrate.

Another aspect of the present disclosure includes a method for reading identifying information from an optically encoded transparent substrate that stores data therein. The method includes providing an optically encoded storage transparent substrate comprising a data zone including optically encoded data therein and optically readable identification indicia outside of the data zone. The optically readable identification indicia corresponds to identifying information regarding the transparent substrate. The method further includes directing light at the optically readable identification indicia identifying information. The optically readable identification indicia includes indicia portions comprising different reflective properties for the light relative to the transparent substrate. In turn, the method includes sensing an intensity of the light reflected from the optically readable indicia and decoding the identifying information from the optically readable identification indicia in response to the sensing operation.

Implementations may include one or more of the following features. The data zone may include at least a portion of a first surface of the transparent substrate. The optically readable identification indicia may be disposed on the second surface extending from the first surface. The optically readable identification indicia may be a one-dimensional barcode. The indicia portions may include etched portions of the transparent substrate to create the different reflective properties for the light relative to the transparent substrate.

In an example, the data zone includes a first portion of a first surface of the transparent substrate, and the optically readable identification indicia may be disposed on the first surface in non-overlapping relation with the data zone. In this example, the method may further include creating the optically encoded data and the optically readable identification indicia using the same optical writing system. Moreover, the decoding operation may include decoding the optically readable identification indicia is readable using a first decoding technique different than a second decoding technique used to decode the optically encoded data. In an example, the method includes creating data voxels disposed in the transparent substrate comprising the optically encoded data. The method may also include creating indicia voxels outside the data zone to create indicia portions comprising the optically readable identification indicia having different reflective properties for the light relative to the transparent substrate. The method may include scanning the indicia portions comprising the indicia voxels.

Another general aspect of the present disclosure includes an optically encoded transparent substrate for storing data. The transparent substrate includes at least a first surface and a second surface. The first surface defines a width and length of the transparent substrate. The second surface extends from the first surface to define a thickness of the transparent substrate. A data zone is defined relative to the first surface and comprising optically encoded data within the transparent substrate. The substrate also includes optically readable identification indicia disposed on the second surface. The optically readable identification indicia include indicia portions comprising different reflective properties for a scanning light relative to the transparent substrate and corresponding to identifying information regarding the transparent substrate. Implementations of this aspect may include one or more of the foregoing features described in relation to the aspects above.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order unless explicitly claimed otherwise or a specific order is inherently necessitated by the claim language.

What is claimed is:

1. An optical storage system, comprising:

a transparent substrate for storage of data, comprising:

a data zone comprising optically encoded data; and identifying information corresponding to the optically encoded data, wherein the identifying information is processed without decoding information from the data zone; and a carrier body disposed about at least a portion of the transparent substrate, the carrier body comprising an identification chip storing data that corresponds to the identifying information of the transparent substrate.

2. The optical storage system of claim 1, wherein the data zone comprises at least a portion of a first surface of the transparent substrate, the transparent substrate further comprising:

a second surface extending from the first surface, wherein the identifying information is disposed on the second surface.

3. The optical storage system of claim 2, wherein the transparent substrate further comprises an optically readable identification indicia comprising a one-dimensional barcode.

4. The optical storage system of claim 3, wherein the optically readable identification indicia comprises respective etched portions of the second surface of the transparent substrate.

5. The optical storage system of claim 4, wherein the optically encoded data and the optically readable identification indicia are created by a common optical writing system.

6. The optical storage system of claim 5, wherein the optically encoded data is readable using a first decoding technique and the identifying information is readable using a second decoding technique different than the first decoding technique.

7. The optical storage system of claim 1, wherein the data zone comprises a first portion of a first surface of the transparent substrate, and wherein the identifying information is disposed on the first surface in non-overlapping relation with the data zone.

8. The optical storage system of claim 1, wherein the optically encoded data comprise voxels disposed in the transparent substrate.

9. The optical storage system of claim 1, wherein the identification chip is readable when the carrier body is disposed about the portion of the transparent substrate.

10. The optical storage system of claim 1, wherein the carrier body comprises a plurality of slots wherein each of the plurality of slots receives the transparent substrate.

11. The optical storage system of claim 1, wherein the carrier body comprises a polymetric material or other relatively soft material.

12. The optical storage system of claim 1, wherein the carrier body is transparent to certain radio frequency (RF) energy.

13. The optical storage system of claim 1, wherein the identification chip is a Radio Frequency Identification (RFID) chip.

14. A method for reading identifying information from a transparent substrate that stores data therein, the method comprising:

creating an optically readable identification indicia outside of a data zone, the optically readable identification indicia corresponding to the identifying information on the transparent substrate;

encoding data into the transparent substrate in the data zone;

associating the optically readable identification indicia with the encoded data; and determining the encoded data provided on the transparent substrate using the optically readable identification indicia, wherein the optically readable identification indicia comprise etched portions of the transparent substrate to create different reflective properties for light relative to the transparent substrate; and decoding the identifying information from the optically readable identification indicia in response to a sensing operation, thereby identifying the transparent substrate without reading the data zone.

15. The method of claim 14, wherein the data zone comprises a first portion of a first surface of the transparent substrate, and wherein the optically readable identification indicia are disposed on the first surface in non-overlapping relation with the data zone.

16. The method of claim 15, further comprising:

creating the encoded data and the optically readable identification indicia using a common optical writing system.

17. The method of claim 16, wherein decoding the identifying information comprises:

decoding the optically readable identification indicia using a first decoding technique different than a second decoding technique used to decode the encoded data.

18. The method of claim 17, further comprising:

creating data voxels disposed in the transparent substrate comprising the encoded data.

19. The method of claim 18, further comprising:

creating indicia voxels outside the data zone to create the etched portions.

20. The method of claim 19, wherein the sensing operation comprises:

scanning the etched portions comprising the indicia voxels.

* * * * *